(12) United States Patent
Gwalani

(10) Patent No.: US 11,846,824 B2
(45) Date of Patent: *Dec. 19, 2023

(54) APPARATUS FOR ALTERING QUANTUM OF LIGHT PASSING THROUGH A LENS OF A PHOTOGRAPHIC DEVICE

(71) Applicant: FREEWELL INDUSTRY COMPANY LIMITED, Hong Kong (HK)

(72) Inventor: Hitesh Gopal Gwalani, Nagpur (IN)

(73) Assignee: FREEWELL INDUSTRY COMPANY LIMITED, Hong Kong (HK)

( * ) Notice: Subject to any disclaimer, the term of this patent is extended or adjusted under 35 U.S.C. 154(b) by 265 days.

This patent is subject to a terminal disclaimer.

(21) Appl. No.: 17/145,420

(22) Filed: Jan. 11, 2021

(65) Prior Publication Data

US 2021/0132320 A1     May 6, 2021

(51) Int. Cl.
*G02B 7/00* (2021.01)
*G02B 5/20* (2006.01)
*G02B 5/30* (2006.01)

(52) U.S. Cl.
CPC ............. *G02B 7/006* (2013.01); *G02B 5/205* (2013.01); *G02B 5/3025* (2013.01)

(58) Field of Classification Search
CPC .......... G02B 7/00; G02B 7/006; G02B 7/003; G02B 7/021; G02B 27/28; G02B 27/281; G02B 5/20; G02B 5/205; G02B 5/30; G02B 5/3025; G03B 11/00; G03B 11/04; G03B 17/12; G03B 17/1756; G03B 17/565; G03B 17/566

USPC .... 359/491.01, 490.01, 490.02, 492.01, 738, 359/888, 890

See application file for complete search history.

(56) References Cited

U.S. PATENT DOCUMENTS

2014/0240854 A1 * 8/2014 Meng ................. G02B 7/003
359/738

FOREIGN PATENT DOCUMENTS

DE     102014013398 A1 *  3/2016   ............. G02B 7/006

OTHER PUBLICATIONS

English translation of DE 102014013398 (Year: 2016).*

* cited by examiner

*Primary Examiner* — Jie Lei

(57) ABSTRACT

An apparatus for altering quantum of light passing through a lens of a photographic device. The apparatus comprises of a base assembly configured to be detachably coupled to the lens of the photographic device, a first assembly comprising a first filter, a second assembly comprising a second filter and a third assembly comprising a third filter. The first assembly is configured to be detachably coupled to the base assembly. The second assembly is configured to be detachably coupled to the base assembly. The third assembly is configured to be detachably coupled to the base assembly. Combination of the first filter and the second filter forms a first range of neutral density filter and combination of the first filter and the third filter forms a second range of neutral density filter.

6 Claims, 8 Drawing Sheets

APPARATUS FOR ALTERING QUANTUM OF LIGHT PASSING THROUGH A LENS OF A PHOTOGRAPHIC DEVICE

BACKGROUND

Field of Invention

The disclosed subject matter relates to the field of photographic device. More particularly, but not exclusively, the subject matter relates to filters for photographic devices.

Discussion of Prior Art

Photographic filters are customized glasses employed to alter the characteristics of light entering the camera lens, thereby allowing a photographer to get required shots. Filters have been in the industry for a long time now and have found application in photography. Filters have enabled users to capture impressive photographs or videos, which would not be possible otherwise.

The filters available in the market are usually of the range 2-10 stops. To achieve this 2-10 stops, at least two filters and a mechanism to rotate the two filters are employed. The filters in such a setup are configured to rotate 360 degrees to achieve the desired result.

However, a major drawback with such a setup is that at a particular point the filters overlap in such a manner that a X shaped shadow is formed in the images. This makes the filter unusable. Furthermore, the construction of the filters available in the market are such that they need to be screwed onto the photographing device to use the photographing device with the filter and unscrew the filter from the photographing device to use the photographing device without the filter. This engaging and disengaging of the filter is a cumbersome process and time consuming. Furthermore, frequent engagement and disengagement of the filter result in wear and tear of the filter and the lens of the photographing device.

In view of the foregoing, it is apparent that there is a need for improved filters which has a simpler construction, and which can overcome the drawbacks of the prior art.

SUMMARY

An embodiment provides an apparatus for altering quantum of light passing through a lens of a photographic device. The apparatus comprises of a base assembly, a first assembly, a second assembly, a third assembly and a lens cover. The base assembly is configured to be detachably coupled to the lens of the photographic device. The first assembly comprises of a first filter, the second assembly comprises of a second filter and the third assembly comprises of a third filter. The first assembly is configured to be detachably coupled to the base assembly. The second assembly is configured to be detachably coupled to the base assembly. The third assembly is configured to be detachably coupled to the base assembly. Combination of the first filter and the second filter forms a first range of neutral density filter and the combination of the first filter and the third filter forms a second range of neutral density filter.

BRIEF DESCRIPTION OF DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Figure 1A:
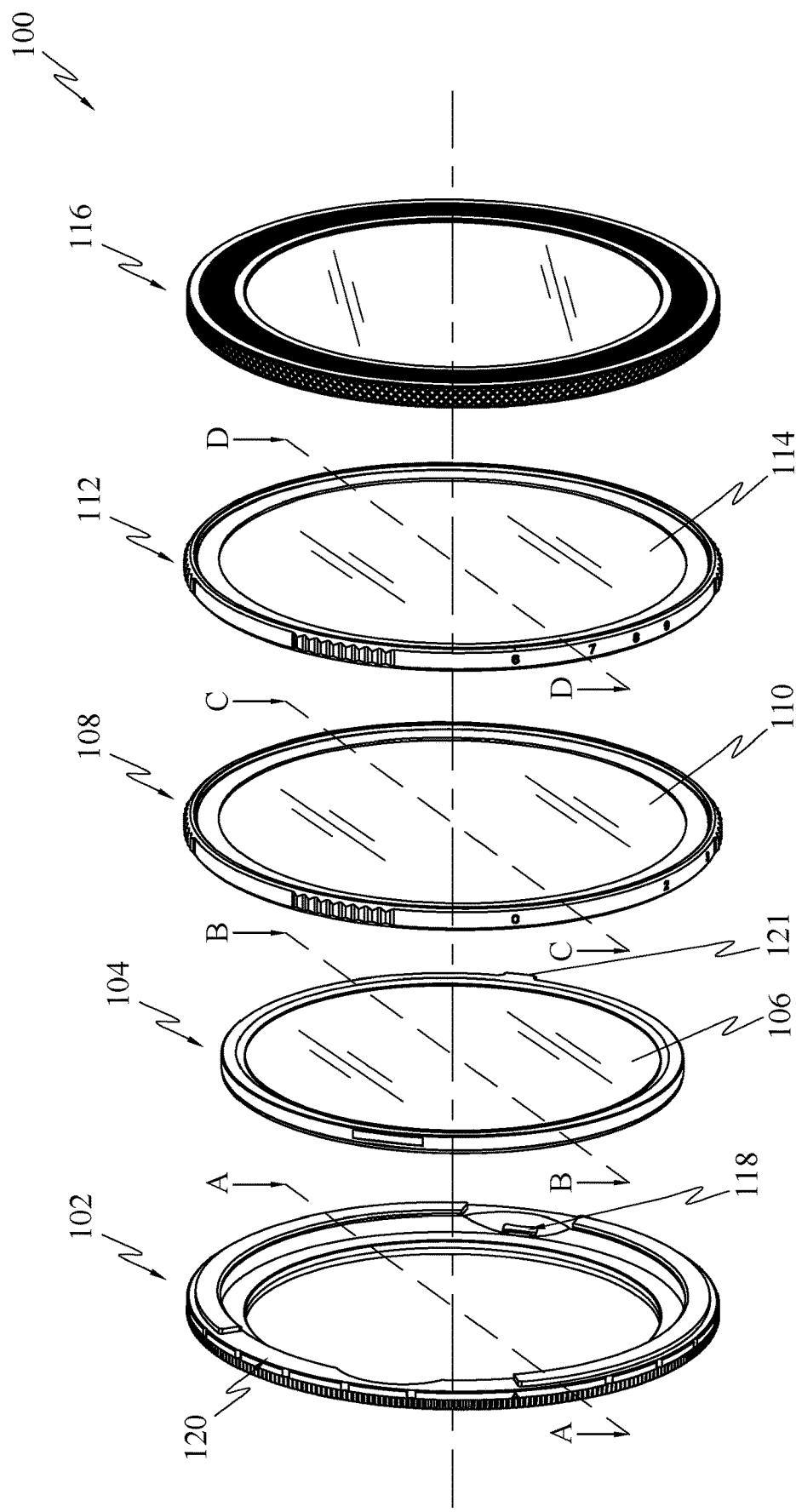
FIG. 1A illustrates an exploded perspective view of an apparatus 100, in accordance with an embodiment.
Figure 1B:
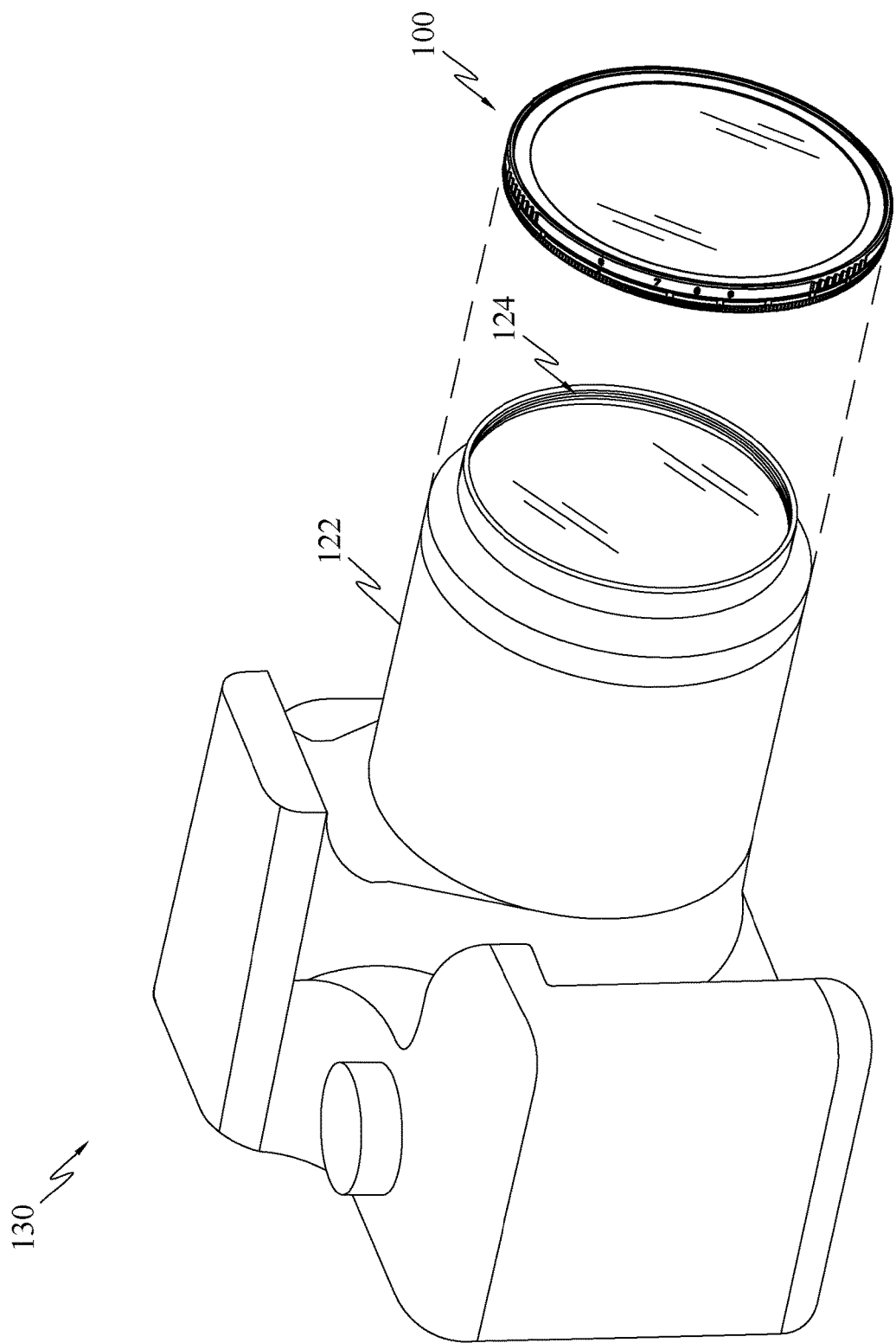
FIG. 1B illustrates perspective view of the apparatus 100 configured to be mounted onto a lens 122 of a photographic device 130, in accordance with an embodiment.

Referring to FIG. 1A-1B, an apparatus 100 is configured to be mounted onto a lens 122 of a photographic device 130. The apparatus 100 comprises of a base assembly 102, a first assembly 104, a second assembly 108, a third assembly 112 and a lens cover 116, in accordance with an embodiment.

In an embodiment, the base assembly 102 may be configured to be detachably coupled to the lens 122 of the photographing device 130. The first assembly 104 comprises of a first filter 106 and the first assembly 104 may be configured to be detachably coupled to the base assembly 102. The second assembly 108 comprises of a second filter 110 and the second assembly 108 may be configured to be detachably coupled to the base assembly 102. The third assembly 112 comprises of a third filter 114, and the third assembly 112 may be configured to be detachably coupled to the base assembly 102.

In an embodiment, the first assembly 104 comprising the first filter 106 and the second assembly 108 comprising the second filter 110 may be combined to form a first range of neutral density (ND) filter. The second assembly 108 may be configured to be detachably coupled to the base assembly 102 while the first assembly 104 is coupled to the base assembly 102 such that the first assembly 104 may be sandwiched between the base assembly 102 and the second assembly 108 to form the first range of ND filter. The first range may be 2-5 stop ND filter.

In an embodiment, the second assembly 108 may be configured to be detachably coupled to the base assembly 102 without the first assembly 104 being coupled to the base assembly 102. The second filter 110 of the second assembly 108, individually without being combined with the first filter 106, may be a Circular Polarizer Filter with function of eliminating reflected light.

In an embodiment, the first assembly 104 comprising the first filter 106 and the third assembly 112 comprising the third filter 114 may be combined to form a second range of ND filter. The third assembly 112 may be configured to be detachably coupled to the base assembly 102 while the first assembly 104 is coupled to the base assembly 102 such that the first assembly 104 may be sandwiched between the base assembly 102 and the third assembly 112 to form the second range of ND filter. The second range may be 6-9 stop ND filter.

In an embodiment, the third assembly 112 may be configured to be detachably coupled to the base assembly 102 without the first assembly 104. The third filter 114 of the third assembly 112, individually without being combined with the first filter 106, may perform as a Neutral Density Filter, meanwhile, may also perform as a Circular Polarizer Filter with function of eliminating reflected light.

Construction

Referring to FIG. 1A, the apparatus 100 comprises of base assembly 102, first assembly 104, second assembly 108, third assembly 112 and the lens cover 116, in accordance with an embodiment. The base assembly 102 may be configured to be detachably engaged to the lens 122 of the photographing device 130. The first assembly 104, second assembly 108, third assembly 112 and the lens cover 116 may be configured to be detachably coupled to the base assembly 102 of the apparatus 100, individually or in combination.

Figure 2A:
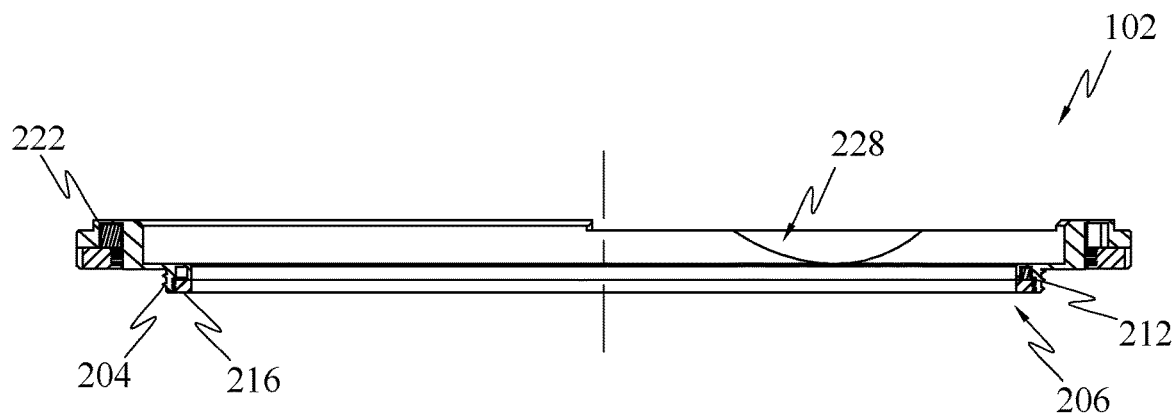
FIG. 2A illustrates an assembled section view of a base assembly 102, in accordance with an embodiment.
Figure 2B:
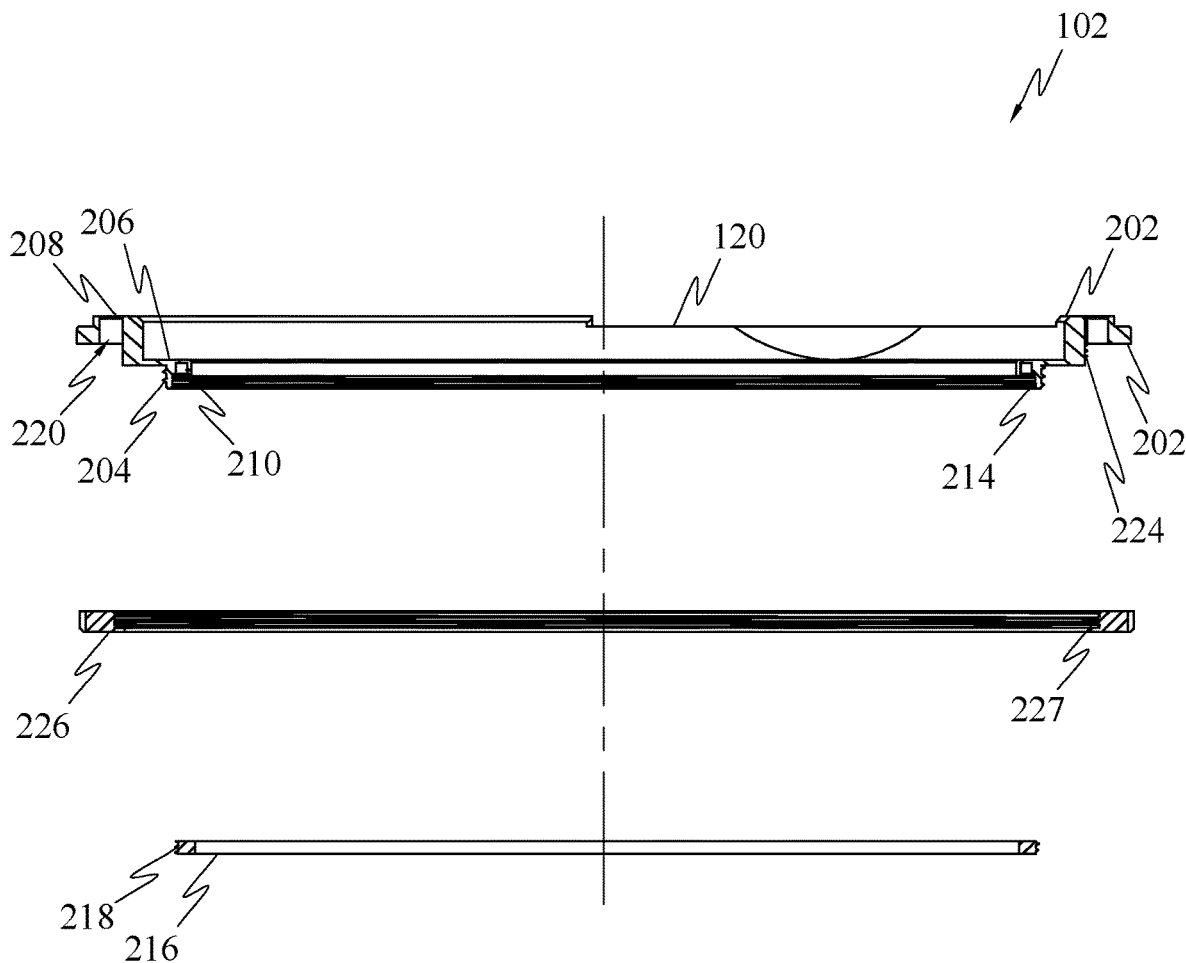
FIG. 2B illustrates an exploded cross section view of the base assembly 102 taken along the line A-A, in accordance with an embodiment.

Referring to FIGS. 2A-2B, the base assembly 102 comprises of a main frame 202, wherein the main frame 202 of the base assembly 102 may be provided with external threads 204 towards proximal end 206, in accordance with an embodiment. The lens 122 of the photographing device 130 may be provided with internal threads 124 (Refer FIG. 1B). The base assembly 102 may be configured to be detachably coupled to the lens 122 of the photographing device 130 via the threads provided on the main frame 202 of the base assembly 102 and the lens 122 of the photographing device 130. The main frame 202 may define a first circumferential platform 206 and a second circumferential platform 208. The first circumferential platform 206 may extend radially inwards such that the first circumferential platform 206 does not block the lens 122 of the photographing device 130, thereby allowing ample amount of light through the lens 122 of the photographing device 130. The second circumferential platform 208 may extend radially outwards, away from the first circumferential platform 206. The second circumferential platform 208 may be elevated relative to the first circumferential platform 206. The second circumferential platform 208 may have a radius larger than that of first circumferential platform 206.

In an embodiment, a first groove 210 may be defined by the main frame 202 under the first circumferential platform 206. The first groove 210 may be configured to receive a first set of one or more magnets 212. An inside portion of the main frame 202 may define internal threads 214. The base assembly 102 comprises of a first holding member 216 that may define external threads 218. The first holding member 216 may be configured to be coupled to the main frame 202 via the threads provided. The first holding member 216 may be configured to hold the first set of one or more magnets 212 received by the first groove 210.

Similarly, in an embodiment, a second groove 220 may be defined by the main frame 202 under the second circumferential platform 208. The second groove 220 may be configured to receive a second set of one or more magnets 222. A portion of the main frame 202 may define external threads 224. The base assembly 102 comprises of a second holding member 226 that may define internal threads 227. The second holding member 226 may be configured to be coupled to the main frame 202 via the threads provided. The second holding member 226 may be configured to hold the second set of one or more magnets 222 received by the second groove 220.

In an embodiment, the first groove 210 and the second groove 220 may be a single circumferential groove, or a plurality of grooves disposed circumferentially under the first circumferential platform 206 and the second circumferential platform 208, respectively.

In an embodiment, the main frame 202 may be provided with chamfered profiles 228 on opposite sides. A positioning groove 118 (Refer FIG. 1A) may be provided within one of the chamfered profiles 228. The main frame 202 of the base assembly 102 may define a gliding surface 120 (Refer FIG. 1A) along a circumference of the second circumferential platform 208, wherein portion of the gliding surface 120 is less than entire circumference of the main frame 202.

Figure 3A:
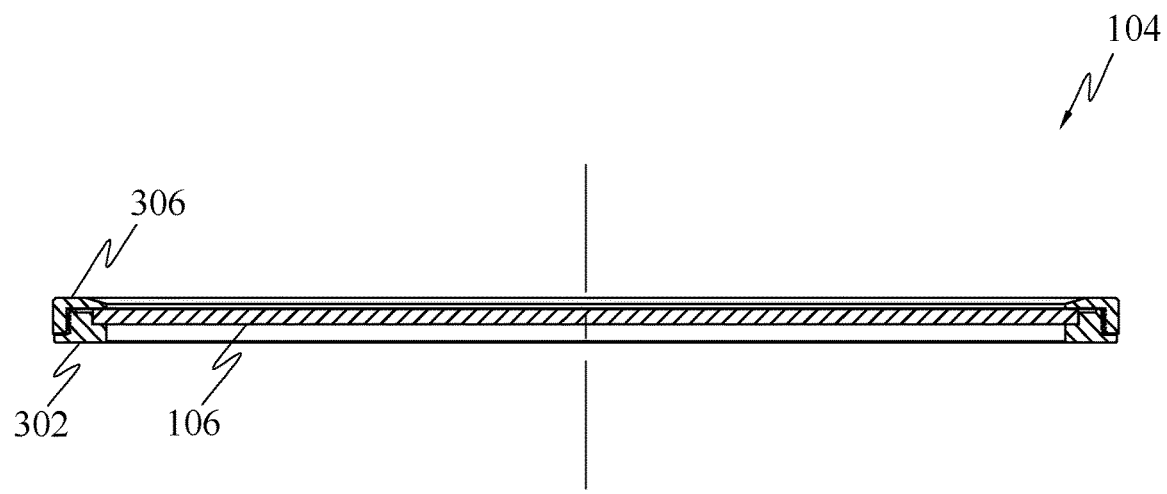
FIG. 3A illustrates an assembled section view of a first assembly 104, in accordance with an embodiment.
Figure 3B:
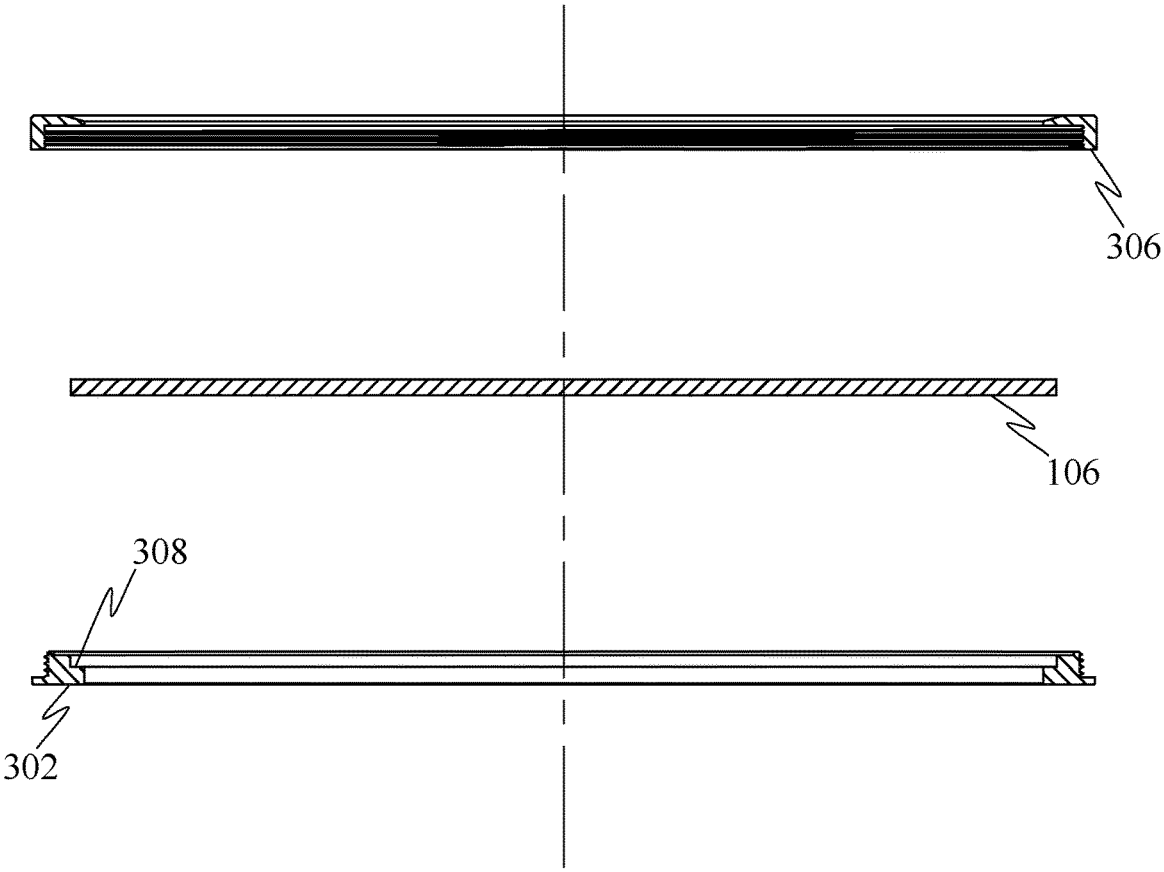
FIG. 3B illustrates an exploded cross section view of the first assembly 104 taken along the line B-B, in accordance with an embodiment.

Referring to FIGS. 3A-3B, the first assembly 104 comprises of a first base frame 302, a first filter 106 and a first engagement member 306, in accordance with an embodiment. The first base frame 302 may define a first base frame circumferential platform 308. The first base frame circumferential platform 308 may be configured to receive the first filter 106. The first base frame 302 of the first assembly 104 may define external threads over its outer surface. The first engagement member 306 may define internal threads. The first engagement member 306 may be engaged to the first base frame 302 via the threads provided. A portion of the first engagement member 306 may extend radially inwards such that at least a portion of the extended portion overlaps the first filter 106. The first engagement member 306 may be configured to hold the first filter 106 in place when the first filter 106 is received by the first base frame circumferential platform 308 of the first base frame 302. The first filter 106 may be replaced by unscrewing the first engagement member 306 holding the first filter 106 in place. The first engagement member 306 may be provided with a positioning protrusion 121 (Refer FIG. 1A).

Figure 4A:
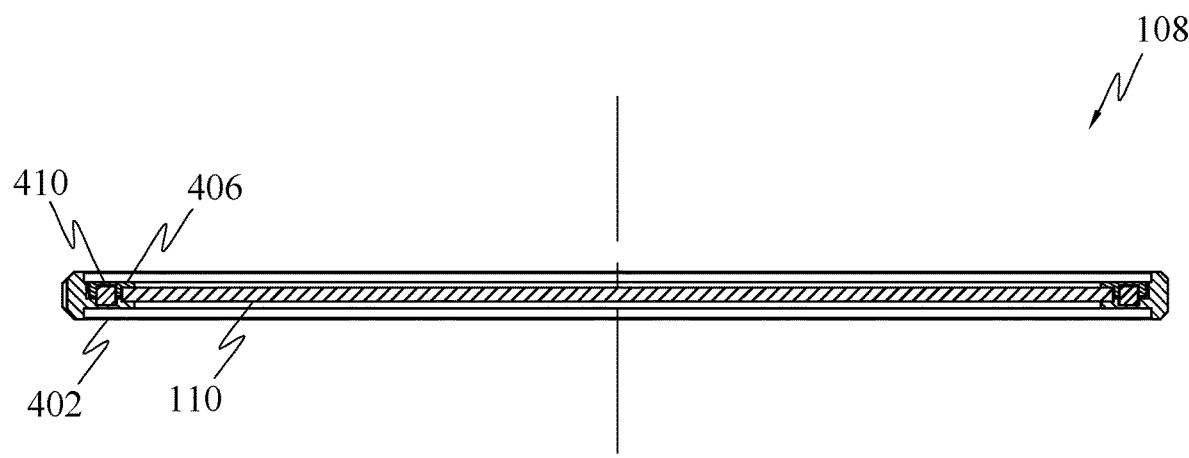
FIG. 4A illustrates an assembled section view of a second assembly 108, in accordance with an embodiment.
Figure 4B:
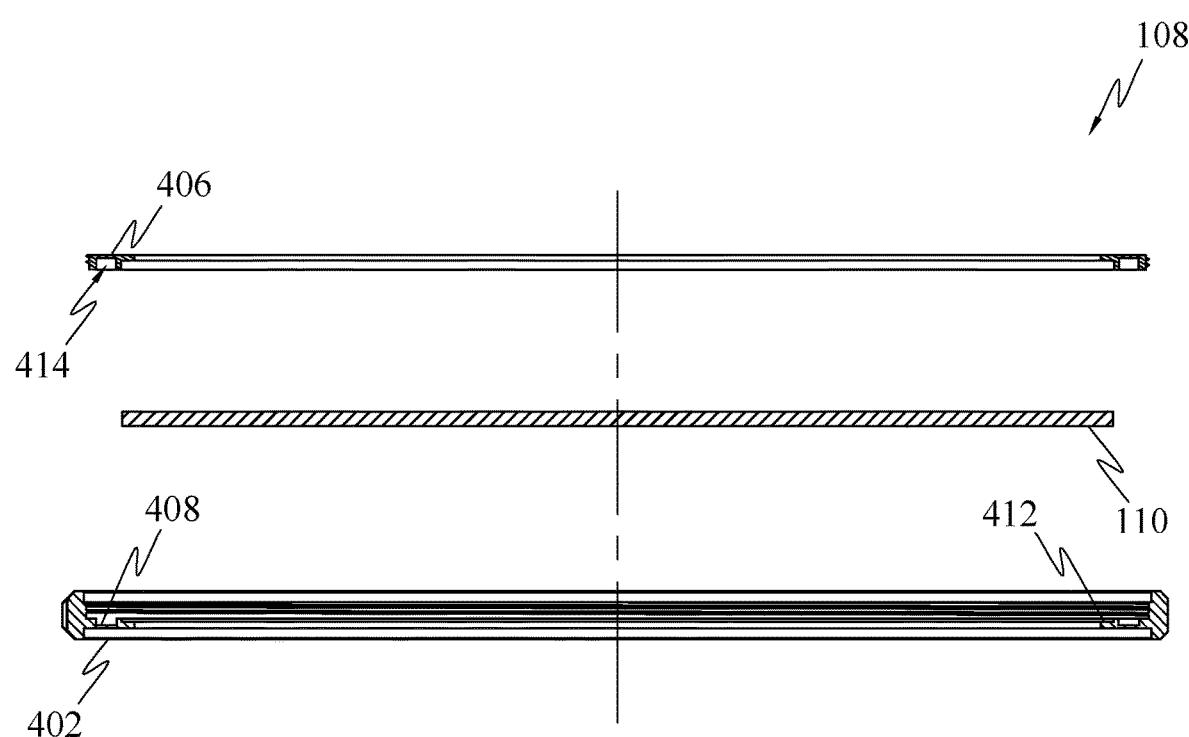
FIG. 4B illustrates an exploded cross section view of the second assembly 108 taken along the line C-C, in accordance with an embodiment.

Referring to FIGS. 4A-4B, the second assembly 108 comprises of a second base frame 402, second filter 110 and a second engagement member 406, in accordance with an embodiment. The second base frame 402 may define a second base frame circumferential groove 408 that may be configured to receive one or more set of magnets 410. The second base frame 402 may define a second base frame circumferential platform 412 that may extend radially inwards from the second base frame circumferential groove 408. The second base frame circumferential platform 412 may receive the second filter 110. A portion of the second base frame 402 may define internal threads over its inner surface. A portion of an outer surface of the second engagement member 406 may define external threads. The second engagement member 406 may define circumferential groove 414 that may align with the second base frame circumferential groove 408 such that the one or more set of magnets are received by space formed by the second base frame circumferential groove 408 and the circumferential groove 414 defined by the second engagement member 406. A portion of the second engagement member 406 extend radially inwards forming a space for the second filter 110 when the second engagement member 406 is engaged to the second base frame 402. The second filter 110 and the one or more set of magnets may be held in place by the second engagement member 406. The second filter 110 may be replaced by unscrewing the second engagement member 406. The second base frame 402 comprises of a first positioning post 602 towards inferior side (Refer FIG. 6).

Figure 5A:
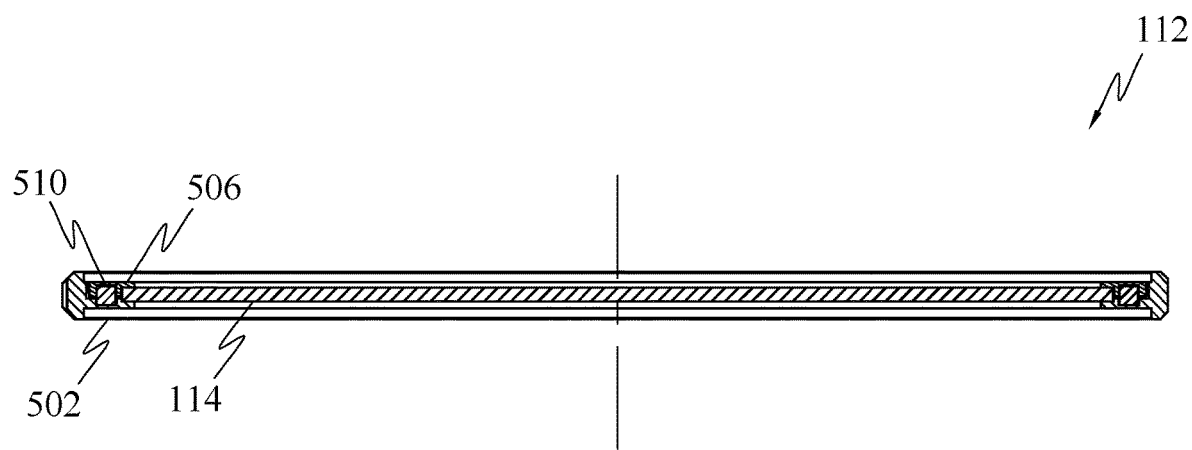
FIG. 5A illustrates an assembled section view of a third assembly 112, in accordance with an embodiment.
Figure 5B:
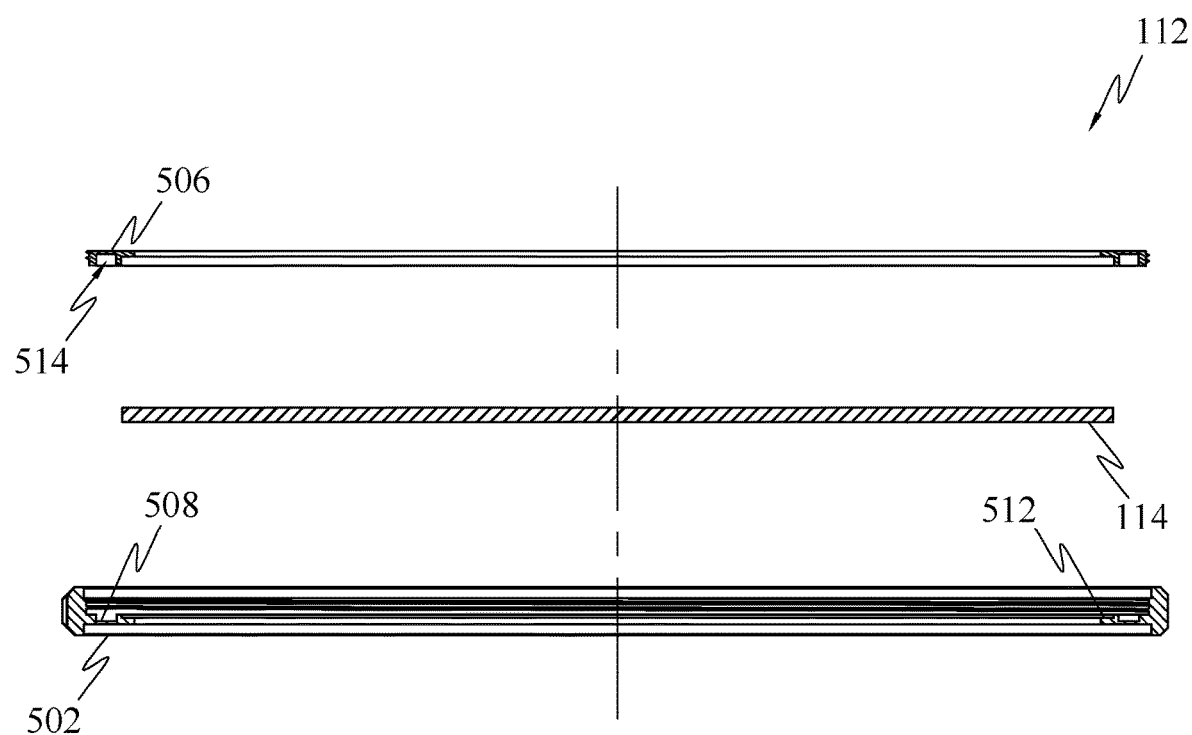
FIG. 5B illustrates an exploded cross section view of the third assembly 112 taken along the line D-D, in accordance with an embodiment.

In an embodiment, the construction of the third assembly 112 is similar to the second assembly 108. Referring to FIGS. 5A-5B, the third assembly 112 comprises of a third base frame 502, third filter 114 and a third engagement member 506, in accordance with an embodiment. The third base frame 502 may define a third base frame circumferential groove 508 that may be configured to receive one or more set of magnets. The third base frame 502 may define a third base frame circumferential platform 512 that may extend radially inwards from the third base frame circumferential groove 508. The third base frame circumferential platform 512 may receive the third filter 114. A portion of the third base frame 502 may define internal threads on its inner surface. A portion of an outer surface of the third engagement member 506 may define external threads. The third engagement member 506 may define circumferential groove 514 that may align with the third base frame circumferential groove 508 such that the one or more set of magnets 510 are received by space formed by the third base frame circumferential groove 508 and the circumferential groove defined by the third engagement member 506. A portion of the third engagement member 506 extend radially inwards forming a space for the second filter 110 when the third engagement member 506 is engaged to the third base frame 502. The third filter 114 and the one or more set of magnets 510 may be held in place by the third engagement member 506. The third filter 114 may be replaced by unscrewing the third engagement member 506. The third base frame 502 comprises of a second positioning post 702 towards inferior side (Refer FIG. 7).

Figure 6:
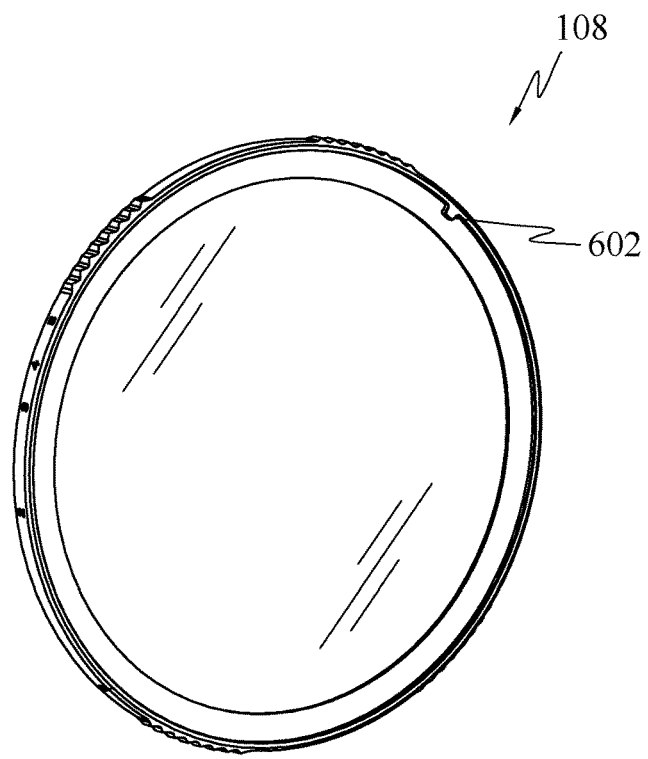
FIG. 6 illustrates a perspective view of the second assembly 108, in accordance with an embodiment.
Figure 7:
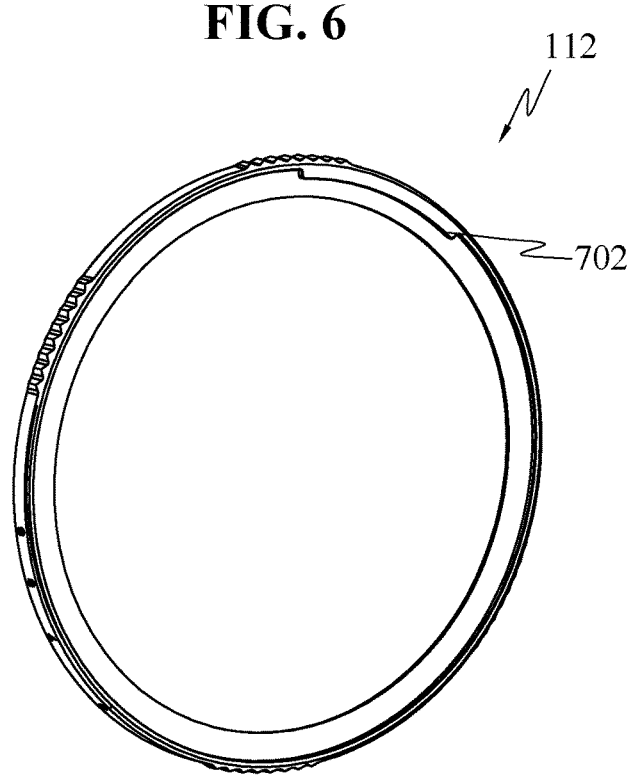
FIG. 7 illustrates a perspective view of the third assembly 112, in accordance with an embodiment.

Referring to FIGS. 6-7, the second base frame 402 and the third base frame 502 may define first positioning post 602 and the second positioning post 604, respectively and may be configured to be received over the gliding surface 120 and rotationally slide over the gliding surface 120. Width of the first positioning post 602 along the gliding surface 120 may be smaller as compared to width of the second positioning post 604 along the gliding surface 120.

Figure 8A:
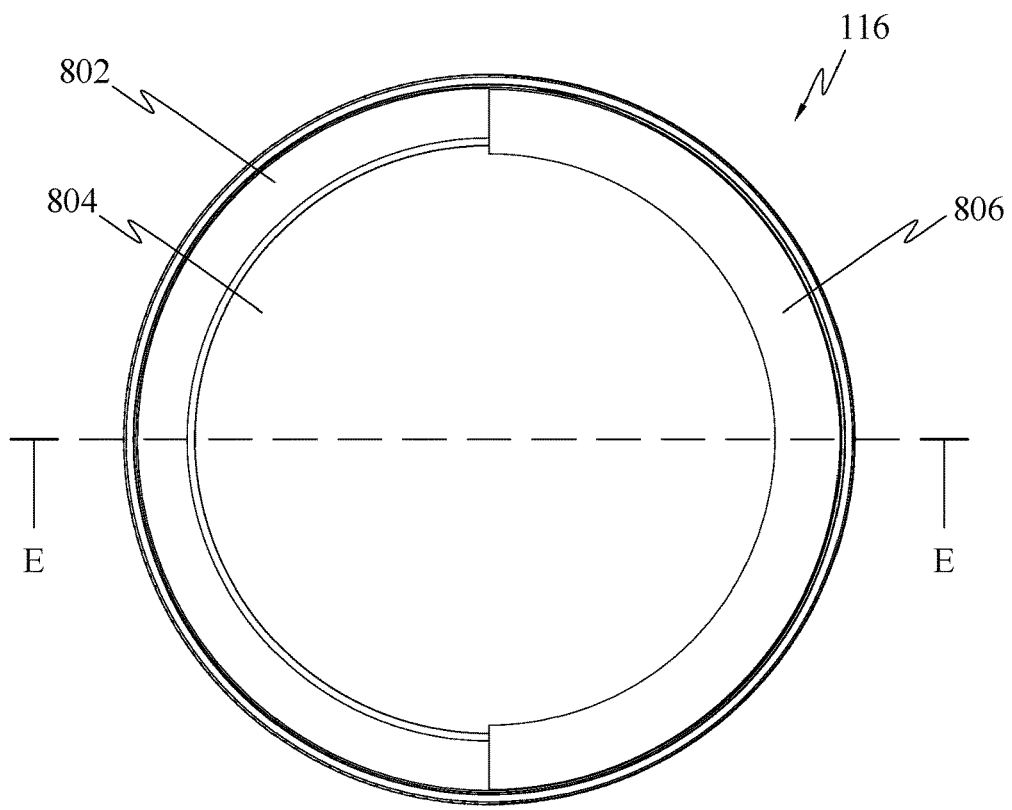
FIG. 8A illustrates rear view of a lens cover 116, in accordance with an embodiment.
Figure 8B:
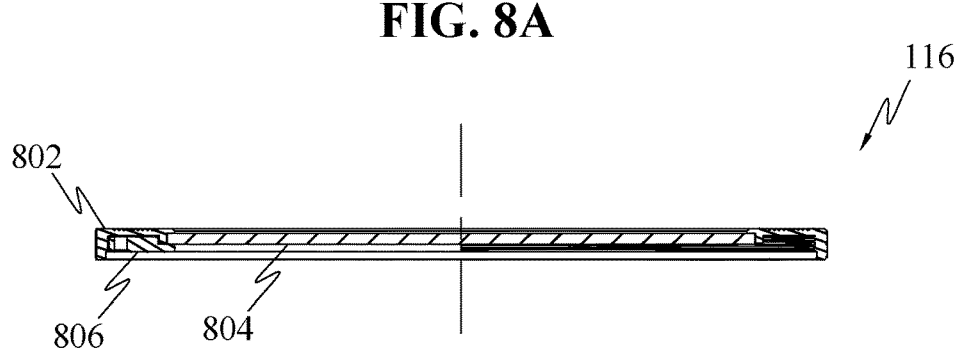
FIG. 8B illustrates a section view of the lens cover 116 taken along section line E-E, in accordance with an embodiment.
Figure 8C:
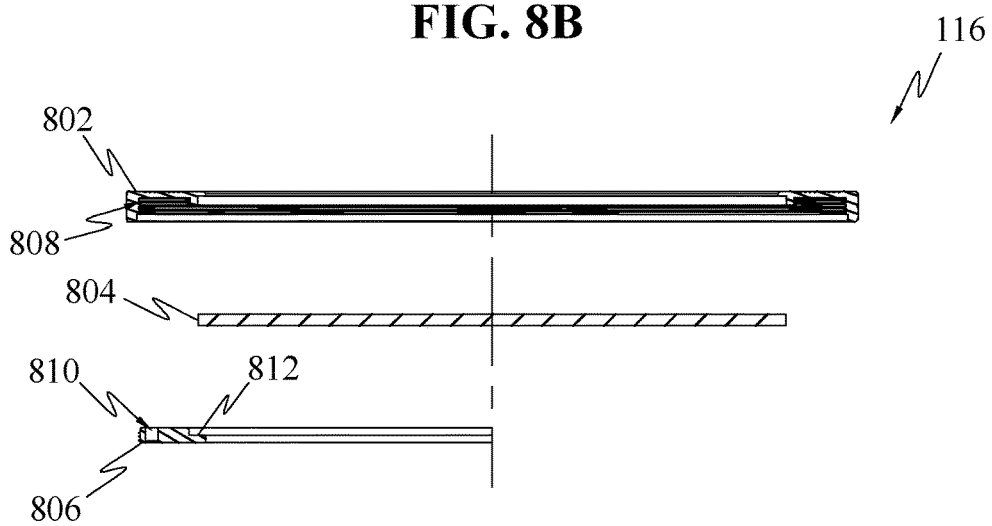
FIG. 8C illustrates an exploded cross section view of the lens cover 116 taken along the line E-E, in accordance with an embodiment.

Referring to FIGS. 8A-8C, the lens cover 116 comprises of a ring frame 802, a glass element 804, one or more set of magnets (not shown in figures) and a pressing ring 806, in accordance with an embodiment. The ring frame 802 may define a ring frame circumferential groove 808 to receive at least a part of the pressing ring 806. The ring frame 802 may define a portion that may extend radially inwards such that the portion overlaps the glass element 804 when assembled. The ring frame 802 may define internal threads over inner surface. The pressing ring 806 may define a pressing ring circumferential groove 810 to receive one or more set of magnets and a pressing ring platform 812 to receive the glass element 804. The pressing ring 806 may define external threads over an outer surface. The pressing ring 806 may be coupled to the ring frame 802 via the threads. The pressing ring 806 may be configured to hold the one or more set of magnets and the glass element 804 in place. A circumferential portion of the ring frame 802 may extend towards proximal end such that a space may be defined to receive at least a part of base assembly 102. The filter may be magnetically detachably coupled to the base assembly 102 to protect the lens 122 of the photographing device 120, when not in use. The magnetic coupling of the lens cover 116 with the base assembly 102 allows easy and fast disengagement of the lens.

Combinations and Working

Referring to FIGS. 1A-8, the base assembly 102 of the apparatus 100 may be configured to be detachably engaged to the lens 122 of the photographing device 130. The base assembly 102 may be mounted onto the lens 122 of the photographing device 130 via the provided respective external and internal threads.

In an embodiment, the first assembly 104 may be configured to be magnetically detachably coupled to the base assembly 102. The first assembly 104 may be coupled such that the positioning protrusion 121 provided on the first engagement member 306 of the first assembly 104 is received by the positioning groove 118 defined by the main frame 202 of the base assembly 102 and the first assembly 104 is received over the first circumferential platform 206 of the base assembly 102. The first base frame 302 of the first assembly 104 may have ferrous property and held by the magnetic force from the first set of one or more magnets 212.

In an embodiment, the second assembly 108 or the third assembly 112 may be received and held over the second circumferential platform 208 of the base assembly 102 by magnetic force from the second set of one or more magnets 222.

In an embodiment, combination of the first filter 106 of the first assembly 104 and the second filter 110 of the second assembly 108 may form a first range of neutral density filter. The first range of the neutral density filter may be from 2-5 stops. The first assembly 104 and the second assembly 108 may be coupled in a way that the first assembly 104 is sandwiched between the base assembly 102 and the second assembly 108, and the first positioning post 602 on the second assembly 108 may be received over the gliding surface 120 of the base assembly 102. The first positioning post 602 of the second assembly 108 may be configured to rotationally slide over the gliding surface 120 provided on the main frame 202 of the base assembly 102. The rotation of the first positioning post 602 may be interrupted by elevated profiles defined by the main frame 202 of the base assembly 102. The second assembly 108 may be detachably coupled with the base assembly 102 in a way that the second assembly 108 rotates relative to the base assembly 102 by a first angle that may be less than 360 degrees. The relative rotation of the second assembly 108 comprising of the second filter 110 allows or obstructs the quantum of light passing through the lens from the range of 2-5 stops.

In an embodiment, combination of the first filter 106 of the first assembly 104 and the third filter 114 of the third assembly 112 may form a second range of neutral density filter. The second range of the neutral density filter may be from 6-9 stops. The first assembly 104 and the third assembly 112 may be coupled in a way that the first assembly 104 is sandwiched between the base assembly 102 and the third assembly 112, and the second positioning post 702 on the third assembly 112 may be received over the gliding surface 120 of the base assembly 102. The second positioning post 702 of the third assembly 112 may be configured to rotationally slide over the gliding surface 120 provided on the main frame 202 of the base assembly 102. The rotation of the second positioning post 702 may be interrupted by elevated profiles defined by the main frame 202 of the base assembly 102. The third assembly 112 may be detachably coupled with the base assembly 102 in a way that the third assembly 112 rotates relative to the base assembly 102 by a second angle that may be less than 360 degrees. The relative rotation of the third assembly 112 comprising of the third filter 114 allows or obstructs the quantum of light passing through the lens from the range of 6-9 stops.

In an embodiment, the first angle of rotation may be larger than the second angle of rotation.

In an embodiment, the second assembly 108 may be detachably coupled to the base assembly 102 without the first assembly 104 being coupled to the base assembly 102. The second filter 110 of the second assembly 108 individually may be a Circular Polarizer Filter with function of eliminating reflected light.

In an embodiment, the third assembly 112 may be detachably coupled to the base assembly 102 without the first assembly 104 being coupled to the base assembly 102. The third filter 114 of the third assembly 112 individually may perform as a Neutral Density Filter, meanwhile, may also perform as a Circular Polarizer Filter with function of eliminating reflected light.

In an embodiment, the lens cover 116 may be detachably coupled to the base assembly 102 whenever the photographing device 130 is not in use. The first assembly 104 may be used in combination with the second assembly 108 and the third assembly 112 to get obtain desired results.

Having two separate filters with different ranges rather than having a single filter for a single long range of stops provides various advantages over the latter. The shadow formation occurring around the $6^{th}$ stop while rotating the filter is eliminated. Furthermore, the combination of the filters allows multiple usage of the filters as opposed to a single filter that is configured to perform a single function of dimming the light. The employment of magnets enables easy attachment and detachment of the filters onto the lens of the photographic device.

It shall be noted that the processes described above are described as sequence of steps; this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications; these should not be construed as limiting the scope of the invention but as merely providing illustrations of some of the personally preferred embodiments of this invention. Thus, the scope of the invention should be determined by the appended claims and their legal equivalents rather than by the examples given.

What is claimed is:

1. An apparatus for altering quantum of light passing through a lens of a photographic device, the apparatus comprising:
 a base assembly configured to be detachably coupled to the lens of the photographic device;
 a first assembly comprising a first filter;
 a second assembly comprising a second filter; and
 a third assembly comprising a third filter;
 wherein,
  the first assembly is configured to be detachably coupled to the base assembly;
  the second assembly is configured to be detachably coupled to the base assembly;
  the third assembly is configured to be detachably coupled to the base assembly;
  combination of the first filter and the second filter enables transmittance of quantum of light through the first filter and the second filter in a first spectral transmittance range;
  combination of the first filter and the third filter enables transmittance of quantum of light through the first filter and the third filter in a second spectral transmittance range;
  the base assembly defines a gliding surface along a portion of a circumference of the base assembly, wherein the portion is less than the entire circumference of the base assembly;
  the second assembly comprises a first positioning post configured to be received over the gliding surface and rotationally slide over the gliding surface;
  the third assembly comprises a second positioning post configured to be received over the gliding surface and rotationally slide over the gliding surface; and
  width of the first positioning post along the gliding surface is smaller compared to width of the second positioning post along the gliding surface.

2. The apparatus as claimed in claim 1, wherein,
 the second assembly is configured to be detachably coupled to the base assembly while the first assembly is coupled to the base assembly to sandwich the first assembly between the base assembly and the second assembly to enable transmittance of quantum of light through the first filter and the second filter in the first spectral transmittance range; and
 the second assembly is configured to be detachably coupled to the base assembly without the first assembly being coupled to the base assembly, wherein the second filter functions as a Circular Polarizer Filter with function of eliminating reflected light.

3. The apparatus as claimed in claim 1, wherein, the third assembly is configured to be detachably coupled to the base assembly while the first assembly is coupled to the base assembly to sandwich the first assembly between the base assembly and the third assembly to enable transmittance of quantum of light through the first filter and the third filter in the second spectral transmittance range; and the third assembly is configured to be detachably coupled to the base assembly without the first assembly being coupled to the base assembly, wherein the third filter performs a function as a Neutral Density Filter, meanwhile, it also perform as a Circular Polarizer Filter with function of eliminating reflected light.

4. The apparatus as claimed in claim 1, wherein the first spectral transmittance range is 2 to 5 stop and the second spectral transmittance range is 6 to 9 stop.

5. The apparatus as claimed in claim 1, wherein, the coupling between the base assembly and the second assembly allows rotation, by a first angle of rotation that is less than 360 degrees, of the second assembly relative to the base assembly; and the coupling between the base assembly and the third assembly allows rotation, by a second angle of rotation that is less than 360 degrees, of the third assembly relative to the base assembly.

6. The apparatus as claimed in claim 5, wherein the first angle of rotation is larger than the second angle of rotation.

* * * * *